United States Patent [19]
Devan et al.

[11] Patent Number: 6,125,458
[45] Date of Patent: Sep. 26, 2000

[54] FAULT MANAGEMENT SYSTEM FOR A TELECOMMUNICATIONS NETWORK

[75] Inventors: Ian Robert Devan, Pinner; Andrew David Chaskell, Ipswich, both of United Kingdom

[73] Assignee: British Telecommunications, London, United Kingdom

[21] Appl. No.: 09/043,240

[22] PCT Filed: Nov. 12, 1997

[86] PCT No.: PCT/GB97/03108

§ 371 Date: Mar. 12, 1998

§ 102(e) Date: Mar. 12, 1998

[87] PCT Pub. No.: WO98/21869

PCT Pub. Date: May 22, 1998

[30] Foreign Application Priority Data

Nov. 13, 1996  [EP]  European Pat. Off. ............. 96308197

[51] Int. Cl.⁷ ............................. G06F 11/00; H04M 1/24; H04M 3/08
[52] U.S. Cl. ................................ 714/43; 379/14; 370/241
[58] Field of Search ................................ 714/25, 37, 43, 714/48, 57, 712, 47; 379/1, 6, 10, 27, 14; 370/241, 242, 245, 248, 251

[56] References Cited

U.S. PATENT DOCUMENTS

| | | | |
|---|---|---|---|
| 4,012,625 | 3/1977 | Bowen et al. | 714/734 |
| 5,592,610 | 1/1997 | Chittor | 714/4 |
| 5,699,403 | 12/1997 | Ronnen | 379/32 |
| 5,774,645 | 6/1998 | Beaujard et al. | 714/25 |
| 5,819,028 | 10/1998 | Manghirmalani et al. | 714/57 |

OTHER PUBLICATIONS

Manione et al, "An inconsistences tolerant approach in the fault diagnosis of telecommunications networks," Proceedings of the Network Operations and Management Symposium, vol. 2 of 3, pp. 459–469, Feb. 1994.

Shimazaki et al, "Neopilot: An integrated ISDN fault management system," Communications Connecting the Future, vol. 3 of 3, pp. 1503–1507, Dec. 1990.

*Primary Examiner*—Robert W. Beausoliel, Jr.
*Assistant Examiner*—Christopher A. Revak
*Attorney, Agent, or Firm*—Nixon & Vanderhye P.C.

[57] ABSTRACT

There is described a method of operating a fault management system for an access network which forms part of a public telecommunications network. In the access network, terminating lines in the form of pairs of copper wires extend from a local switch through a series of nodes to terminal equipment provided for a use of the network. The fault management system includes a test head and an access network management system. Each night, the test head performs a series of tests on each of the terminating lines. The results of the tests are transmitted to the access network management system. The test results are then converted into circuit scores, each of which are indicative of the operational quality of the tested circuit. For each node, the circuit scores of the tested circuits passing through the node are combined to produce a node score which is indicative of the operational quality of the node. In order to identify the node having the worst operational quality and therefore most in need of investigation, the nodes are ranked in accordance with their node scores.

10 Claims, 9 Drawing Sheets

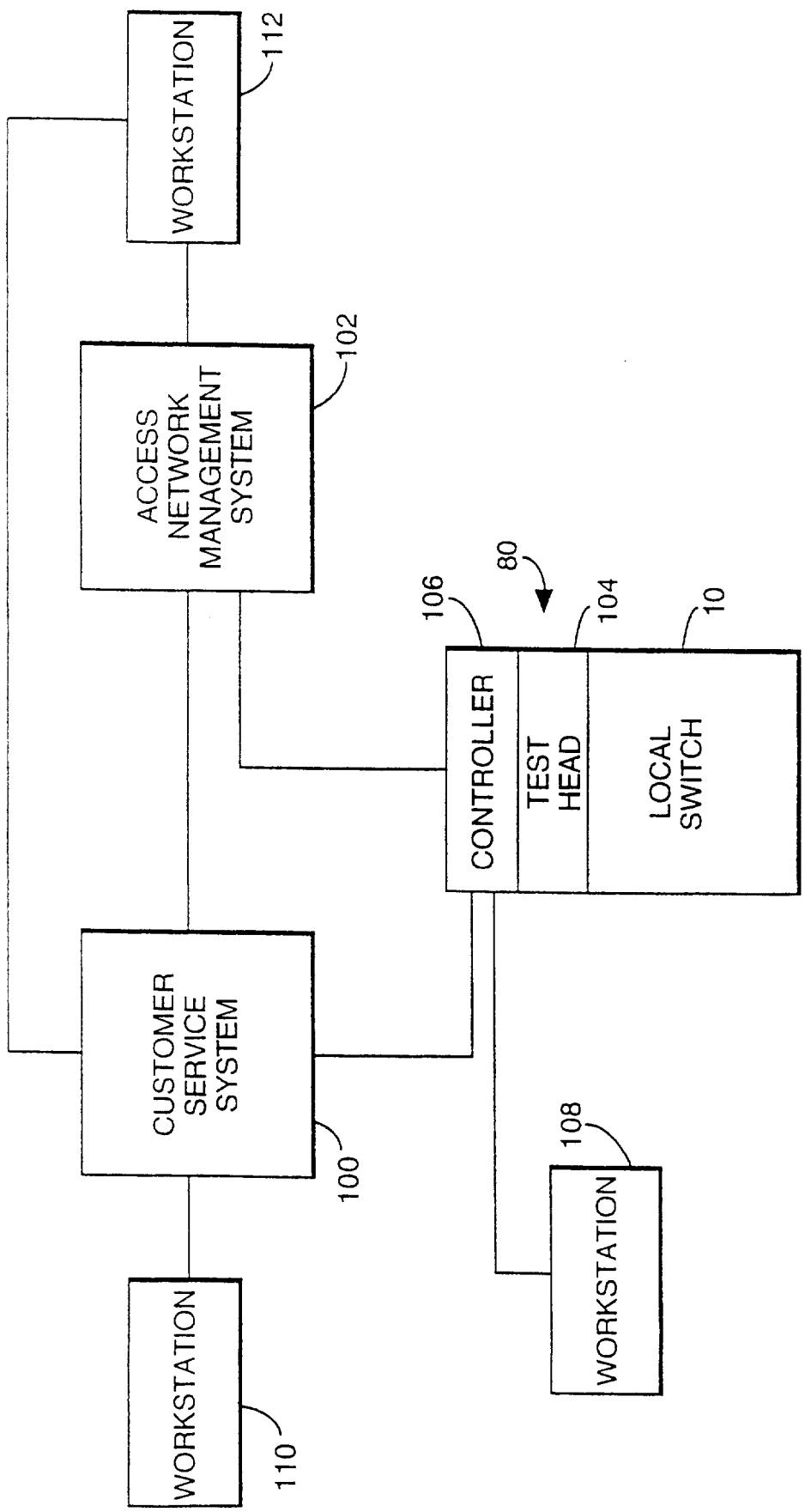

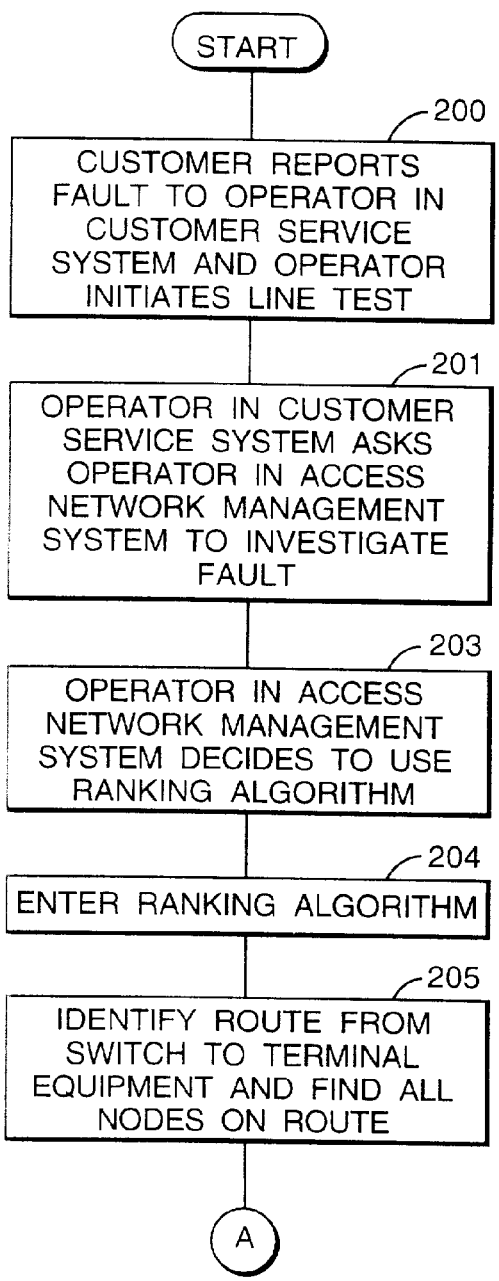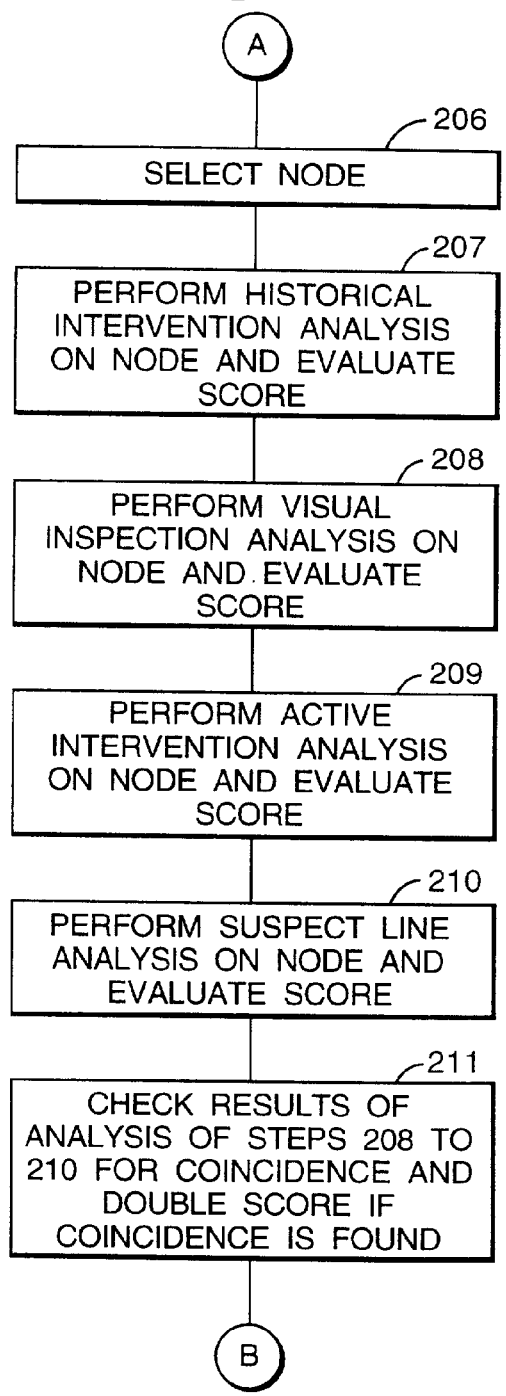

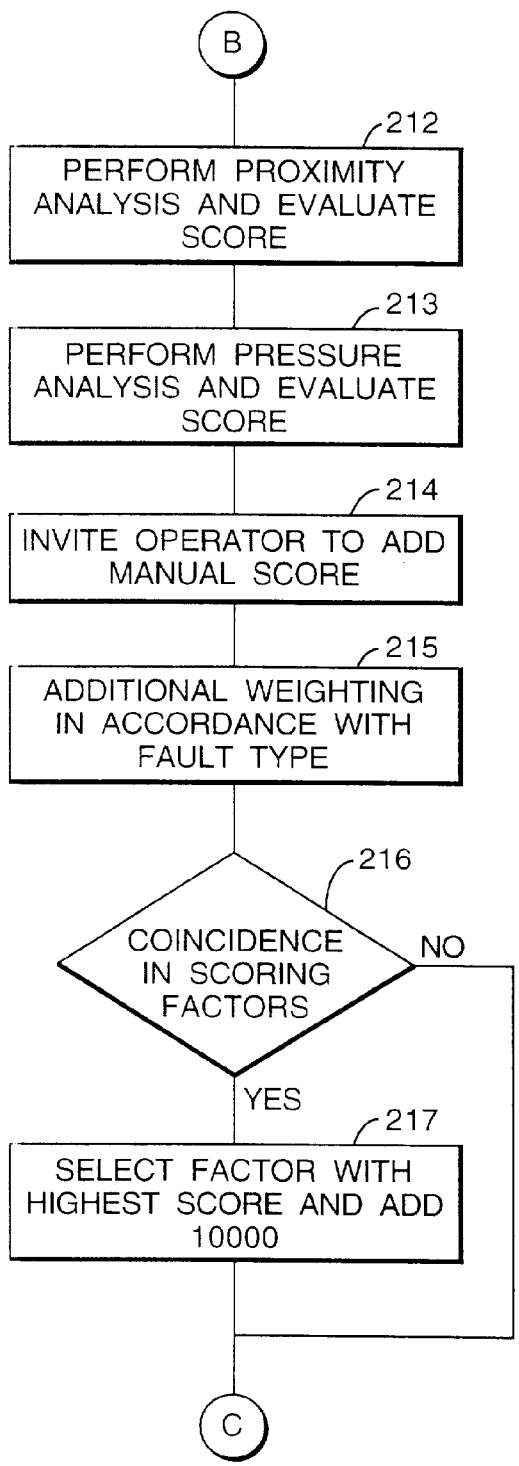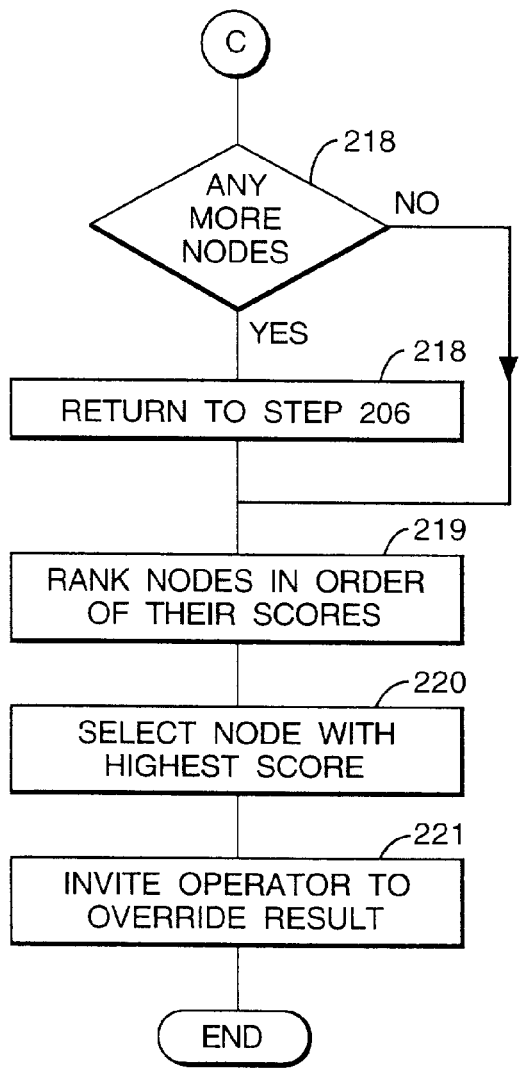

FAULT MANAGEMENT SYSTEM FOR A TELECOMMUNICATIONS NETWORK

This invention relates to a fault management system for managing faults in the terminating circuits of a telecommunications network and also to a method of operating such a fault management system.

A conventional public telecommunications network comprises a relatively small number of interconnected main switches and a much larger number of local switches, each of which is connected to one or two main switches. The local switches are connected to the terminating circuits of the network and the far ends of these circuits are connected to terminal equipment such as telephone instruments provided for users of the network. The network formed from the main switches and local switches is known as the core network while a network formed from the terminating circuits is known variously as an access network or a local loop. In this specification, it will be referred to as an access network. Some terminating circuits are connected to a remote concentrator, which may or may not have switching capability. The remote concentrator is then connected to a local switch. In this specification, the term "local switch" is to be interpreted to cover both local switches and remote concentrators.

In a conventional access network, each terminating circuit is formed from a pair of copper wires. Typically, each pair of copper wires passes through a series of nodes between the local switch and terminal equipment. Examples of such nodes are primary cross-connect points, secondary cross-connect points, distribution points and joints.

Recently, optical fibres have been used to carry terminating circuits in access networks. In a modern access network, both pairs of copper wires and optical fibres are used to carry the terminating circuits. Where a terminating circuit is carried by an optical fibre, the circuit will typically pass through several nodes between the local switch and the terminal equipment. At each node, the incoming fibre from the local switch is split into a group of outgoing fibres which branch out in various directions. Where a terminating circuit is carried by an optical fibre from the local switch, the last part of the circuit may be carried by a pair of copper wires.

Unfortunately, terminating circuits are prone to faults. In the case of a terminating circuit carried by a pair of copper wires, example of such faults are disconnection, a short circuit between two wires of a pair of wires and a short circuit between one of the wires and earth. In the case of a conventional access network formed from pairs of wires, the causes of the faults include ingress of water into a node and also physical damage to a node.

When a customer reports a fault, the terminating circuit may be tested so as to identify the cause of the fault. The fault can then be repaired. However, until the fault is repaired, the user suffers a loss of service.

It is known how to perform a set of circuit tests on each terminating circuit in an access network on a routine basis, for example nightly. Such routine tests can detect a fault on a terminating circuit. The fault can then be repaired, possibly before the user of the terminating circuit notices a loss of service. However, at present such routine tests do not measure the operational quality of individual nodes of an access network. Where the operational quality of a node is poor, it is likely that faults will develop in terminating circuits passing through the node. It is desirable to detect a node having a poor operational quality at an early stage, and preferably before the poor operational quality of the node has caused faults in terminating circuits passing through it.

According to one aspect of the invention, there is provided a method of operating a fault management system for a telecommunications network, said telecommunications network including a switch and an access network of terminating circuits connecting said switch to terminal equipment provided for users of the telecommunications network, each of said terminating circuits passing through a series of nodes between said switch and its respective terminal equipment, said fault management system comprising:
 circuit testing apparatus arranged to perform circuit tests on said terminating circuits; and
 a computer system for controlling the circuit testing apparatus, said computer system including a store containing data relating to said terminating circuits and said nodes;
said method comprising the following steps performed by said computer system:
 instructing said circuit testing apparatus to perform a circuit test on each circuit of at least a subset of said terminating circuits and to produce a test result for each circuit so tested;
 converting the test results into circuit scores each of which is indicative of the operational quality of the tested circuit; and
 for each node of at least a subset of said nodes, combining the circuit scores of the tested circuits passing through the node to produce a node score which is indicative of the operational quality of the node.

By providing an indication of the operational quality of each node, it is possible to detect a deterioration in the operational quality of an individual node at an early stage. The operational condition can then be restored, perhaps before the occurrence of faults in terminating circuits passing through the node.

According to another aspect of the invention, there is provided a fault management system for a telecommunications network including a switch and an access network of terminating circuits connecting said switch to terminal equipment provided for users of the telecommunications network, each of said terminating circuits passing through a series of nodes between said switch and its respective terminal equipment, said fault management system comprising:
 circuit testing apparatus arranged to perform circuit tests on said terminating circuits to produce test results;
 a store containing data relating to said terminating circuits and said nodes;
 means for converting a test result into a circuit score which is indicative of the operational quality of the tested circuit; and
 means for combining the circuit scores of the tested circuits passing through a node to produce a node score which is indicative of the operational quality of the node.

According to a further aspect of this invention, there is provided a fault management system for a telecommunications network including a switch and a network of terminating circuits connecting said switch to terminal equipment provided for users of the telecommunications network, each of said terminating circuits passing through a series of nodes between the said switch and its respective terminal equipment, said fault management system comprising:
 circuit testing apparatus arranged to perform circuit tests on said terminating circuits to produce test results;
 a computer system for operating said circuit testing apparatus;

said computer system including a store containing data relating to said terminating circuits and said nodes;

said computer system being controlled by at least one program so as to perform the following operations:

instruct said circuit testing apparatus to perform a circuit test on each circuit of at least a subset of said terminating circuits and to produce a test result for each circuit so tested;

convert the test results into circuit scores each of which is indicative of the operational quality of the test circuit; and for each node of at least a subset of said nodes, combine the circuit scores of the tested circuits passing through the node to produce a node score which is indicative of the operational quality of the node.

This invention will now be described in more detail, by way of example, with reference to the drawings in which:

FIG. 3 is a block diagram showing the components of the telecommunications network which are used to provide a fault management system embodying this invention for the access network of FIG. 1;

FIGS. 6A–6D is a flow chart of the steps which are performed in the fault management system in estimating the location of a suspected fault in the access network;

Figure 1:
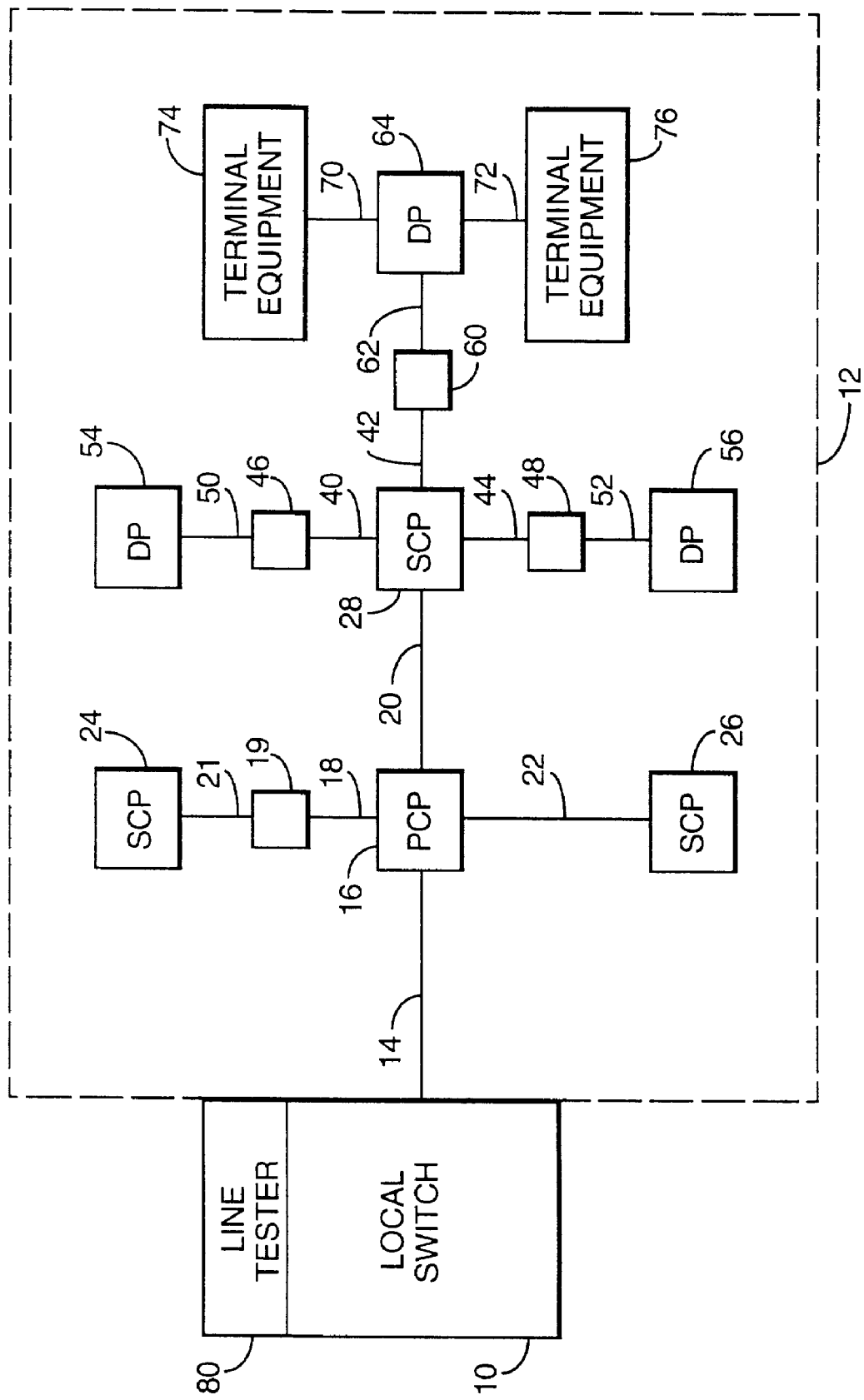
FIG. 1 is a block diagram of an access network and an associated local switch which form part of a telecommunications network in which the present invention may be used.

Referring now to FIG. 1, there is shown a local switch 10 and a conventional access network 12 connected to the local switch 10. The local switch 10 and the access network 12 form part of a public telecommunications network. The local switch 10 is connected to the terminating circuits or lines of the access network 12. Typically, a local switch is connected to several thousand terminating circuits. Each terminating circuit or line passes through several nodes before reaching its respective terminal equipment. These nodes comprise primary cross-connect points, secondary cross-connect points, distribution points and junctions and examples of these nodes will be described below.

In the conventional access network 12 shown in FIG. 1, each terminating circuit or line is formed from a pair of copper wires. The copper wires leave the local switch 10 in the form of one or more cables. One of these cables is shown in FIG. 1 and indicated by reference numeral 14. The far end of cable 14 from switch 10 is connected to a primary cross-connect point 16 which may be housed in a street cabinet or underground junction box. From the primary cross-connect point 16, the terminating lines branch out as cables in several directions. For simplicity, in FIG. 1 there are shown only three cables 18, 20 and 22. The far end of cable 18 is connected to a joint 19. The joint 19 is connected by cable 21 to a secondary cross-connect point 24. The far ends of cables 20 and 22 are connected, respectively, to secondary cross-connect points 26 and 28. For reasons of simplicity, the continuations of the terminating lines beyond secondary cross-connect points 24 and 26 are not shown. The secondary cross-connect points 24, 26 and 28 are housed in junction boxes which may be located above or below ground.

From the secondary cross-connect point 28, the terminating lines branch out again in several directions in the form of cables. By way of illustration, FIG. 1 shows cables 40, 42, and 44 leaving the secondary cross-connect point 28. Cables 40 and 44 are connected, respectively, to joints 46 and 48. Joints 46 and 48 are connected, respectively, to cables 50 and 52, the far ends of which are connected to distribution points 54 and 56.

The far end of cable 42 is connected to a joint 60. The joint 60 is connected by cable 62 to a distribution point 64. For reasons of simplicity, the terminating lines beyond distribution points 54 and 56 are not shown.

Distribution points are implemented as junctions boxes which are typically located on telephone poles. From each distribution point, the terminating lines branch out as single copper wire pairs to where terminal equipment provided for a user of the network is located. By way of illustration, FIG. 1 shows two single copper wire pairs 70, 72, leaving the distribution point 64. The far ends of copper wire pairs 70 and 72 are connected, respectively, to terminal equipment 74, 76. As is well known, terminal equipment may take various forms. For example, terminal equipment may be a public telephone located in a public telephone box, a telephone instrument located in a domestic house or an office, or a fax machine or a computer located in a customer's premises.

In the example shown in FIG. 1, each of the joints 19, 46, 48 and 60 is used to connect two cables together. Joints may also be used to connect two or more smaller cables to a larger cable.

The cable 14 is housed in a duct. The air in the cable 14 is kept at a pressure above ambient pressure. This discourages ingress of water to the cable 14.

In each terminating line, the two wires of each pair are designated as the A wire and the B wire. At the local switch 10, in order to supply current to the line, a bias voltage of 50V is applied between the A wire and the B wire. As the bias voltage was applied in the early exchanges by using a battery, the bias voltage is still known as the battery voltage. In the terminal equipment, the A wire and B wire are connected by a capacitor, the presence of which may be detected when the terminal equipment is not in use.

The terminating lines in the access network 10 are prone to faults. The main causes of these faults are ingress of water and physical damage to the nodes through which the terminating lines pass between the local switch 10 and terminal equipment. There are five main faults which occur due to causes arising in the nodes. These faults are disconnection, short circuit, faulty battery voltage, earthing fault and low insulation resistance. A disconnection arises where a terminating line is interrupted between the local switch and the terminal equipment. A short circuit arises where the A wire and B wire of a line are connected together. A faulty battery voltage arises where the A wire or the B wire of a terminating line has a short circuit connection to the B wire of another line. An earthing fault arises when the A wire or B wire is connected to earth or the A wire of another line. Low insulation resistance arises where the resistance between the A wire and the B wire or between one of the wires and earth or between one of the wires and a wire of another line is below an acceptable value.

In order to detect faults in the terminating lines of the access network 12, the local switch 10 is provided with a line tester 80. The line tester 80 may be operated from the local switch 10 or, as will be explained in more detail below, from a remote location. The line tester 80 is capable of performing various tests, examples of which will be described below. Various models of line testers for local switches are available commercially. In the present example, the line tester 80 is supplied by Porta Systems of Coventry, England.

Figure 2:
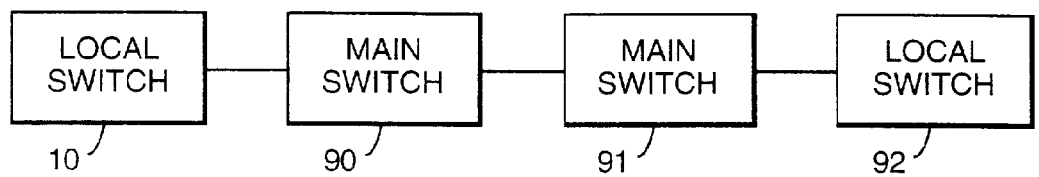
FIG. 2 is a block diagram showing the arrangement of some of the local switches and main switches of the telecommunications network mentioned with reference to FIG. 1.

Referring now to FIG. 2, there are shown some of the switches of the telecommunications network in which the local switch 10 is located. In addition to the local switch 10, FIG. 2 shows two main switches 90, 91 and a further local switch 92. The main switches 90, 91 are part of a fully interconnected network of main switches. The local switches 10 and 92 are part of a much larger number of local switches. Each local switch is connected to one or two main switches. Thus, the main switches 90, 91 connect the local switches together.

Referring now to FIG. 3, there is shown the local switch 10 and the components of the telecommunications network which provide a fault management system for the access network 12. These components comprise the line tester 80, a customer service system 100 for the telecommunications network and an access network management system 102.

As shown in FIG. 3, the line tester 80 comprises a test head 104 which contains the electronic equipment for physically making line tests and a controller 106 for the test head 104. The controller 106 takes the form of a computer. The controller 106 can be operated from a workstation 108 connected to it and provided at the local exchange 10. The controller 106 is also connected to both the customer service system 100 and the access network management system 102 and can be operated by workstations connected to either the customer service system 100 or the access network management system 102.

The customer service system 100 is also a computer and it can be operated from any one of a number of workstations which are connected to it. In FIG. 3, one such workstation is shown and indicated by reference numeral 110. The customer service system 100 is used by operators of the public telecommunications network who have direct telephone contact with the customers of the network. Together with these operators, the customer service system is responsible for providing various services to the customers. These services include the provision of new telephone lines, answering billing enquiries and responding to fault reports received from customers.

The access network management system 102 is also a computer and it can be operated from one of a number of workstations. One of these workstations is shown in FIG. 3 and indicated by reference numeral 112. The access network management system 102 is responsible for managing the access network 12 as well as a number of other access networks in the same general geographical area as the access network 12. The access network management system manages various operations for each of the access networks which it manages. These operations include the provision of new equipment, logging data on work performed by engineers in the network, maintaining data on the terminating lines and nodes of each access network detection and management of faults. The workstations which are connected to the access network management system 102 are also connected to the customer service system 100. As shown in FIG. 3, the customer service system 100 and the access network management system 102 are connected together.

The operations performed by the customer service system 100 and the access network management system 102 apart from the detection and management of faults in the access network 12 do not form part of the present invention and will not be described in further detail.

Although in the present example the fault management system for the access network 12 is formed from the line tester 80, the customer service system 100 and the access network management system 102, the fault management system could also be provided simply by the line tester 80 on its own. In order to achieve this, it would be necessary to add appropriate software to the computer which forms the controller 106. In a small network, this might be an appropriate form of providing the fault management system. However, in a large public network it is advantageous to integrate the fault management system into the customer service system 100 and the access network management system 102.

Figure 4:
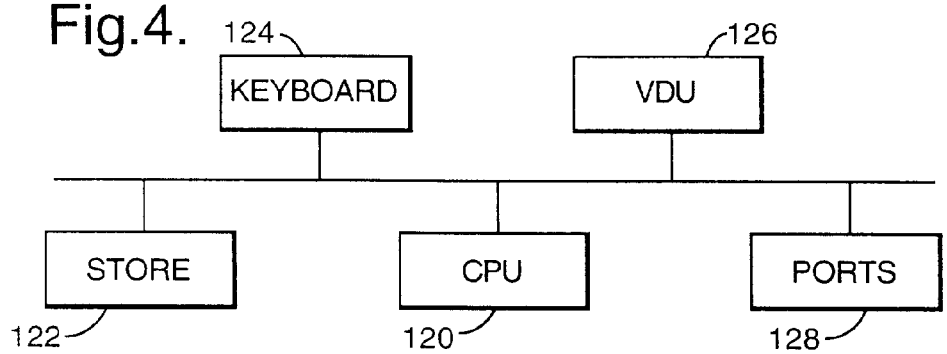
FIG. 4 is a block diagram of the main hardware components of a typical computer.

As mentioned above, the controller 106, the customer service system 100 and the access network management system 102 are each implemented as a computer. The main hardware components of a computer are shown in FIG. 4. these comprise a central processing unit (CPU) 120, a store 122, a keyboard 124, a visual display device (VDU) 126 and input and output ports 128 for connecting the computer to other computers. The store 122 comprises hard disk storage, floppy disk storage, random access memory and read only memory. The store 122 is used for storing data used by the computer and also for storing the programs which control the computer.

As will be explained below, in the fault management system, one of the parameters which is used for finding a fault in a terminating line, as far as it is available, is the distance of each node through which the terminating line passes from the local switch 10. In a typical access network these distances will be known for some, but not all, of the nodes. For some of these nodes, the distance is known from maps of the cables of the access network. In the present example, where these distances are known from maps, the appropriate data is held both in the customer service system 100 and the access network management system 102.

The fault management system of this example also provides a method of measuring the distance of a node from the local switch 10 when the node is opened by an engineer. The flow chart for the operations which are performed when measuring this distance is shown in FIG. 5 and these operations will now be described.

Initially, in a step 140, an engineer opens a node and makes a telephone call to a colleague sitting at one of the workstations connected to the access network management system 102 to ask him to make line tests. Then, he disconnects one of the line pairs of the node and gives the directory number of this line pair to his colleague in a step 142. Using the connection between his workstation and the line tester 80, the colleague instructs the line tester 80 to perform line tests on the open line pair. In these line tests, the resistance between the A wire and B wire, the capacitance between the A wire and B wire, the capacitance between the A wire and earth and the capacitance between the B wire and earth are measured in a step 144.

Then, in a step 146, the line tester 80 uses the results of the tests to calculate the distance from the switch to the node. Next, in a step 148, the results of the tests including the distance to the node are stored in the customer service system unless the node is a joint. Finally, in a step 150, the results of the tests including the distance to the node are stored in the access network management system 150. These results are stored in step 150 for all nodes including joints.

Figure 5:
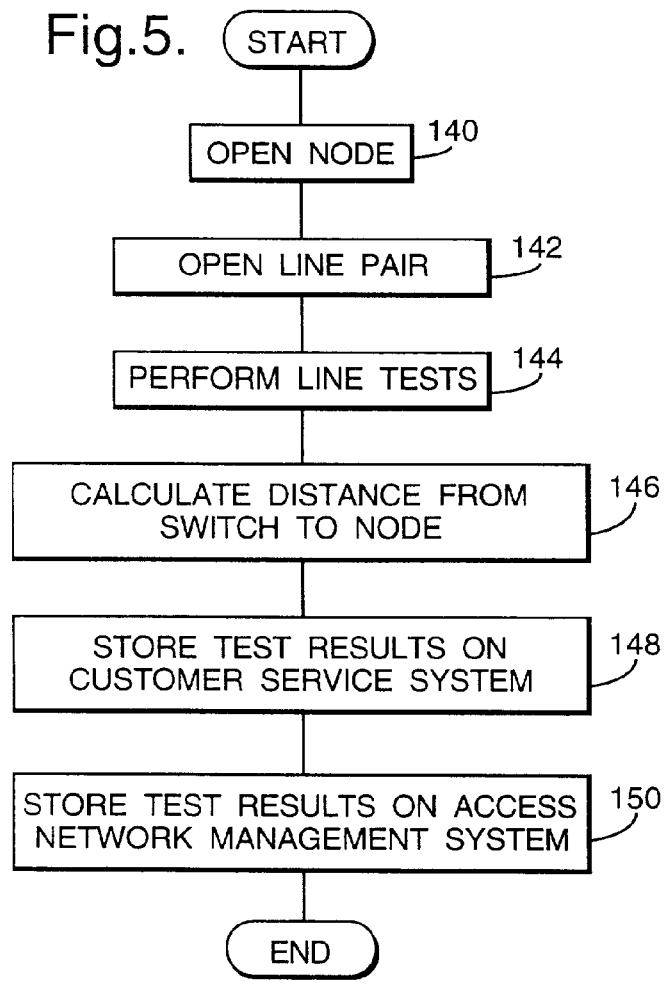
FIG. 5 is a flow chart of the steps which are performed in the fault management system to obtain reference data on a node of the access network.

By performing the operations shown in the flow chart of FIG. 5 each time a node is opened, reference data including the distances of the nodes from the switch can be gradually built up. The series of operations shown in FIG. 5 is performed under the control of computer programs located in the controller 106, customer service system 100 and access network management system 102.

The controller 106 is programmed to cause the test head 104 to make a series of routine tests each night on each terminating line of the access network 12. These tests will be explained with reference to the circuit diagram shown in FIG. 8.

Figure 8:
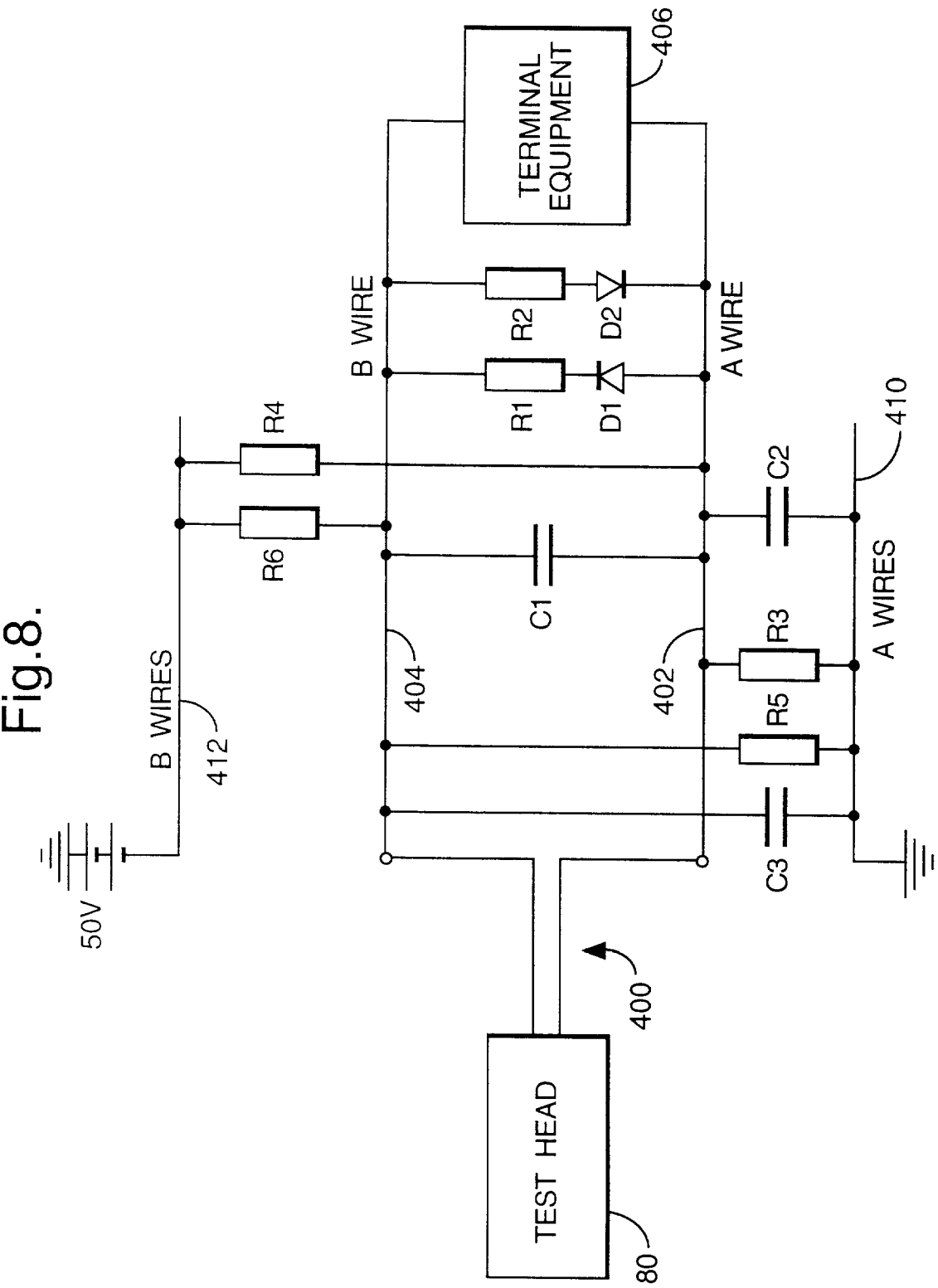
FIG. 8 is a circuit diagram illustrating some of the measurements which are made when testing a terminating circuit.

In order to test a line, it is disconnected from the switch 10 and connected to the test head 104. FIG. 8 shows a line 400 being tested. The line 400 has an A wire 402 and a B wire 404. The end of line 400 remote from switch 10 is connected to terminal equipment 406. Each of the lines 402, 404 has a resistance which depends upon its diameter and the distance from the local switch to the terminal equipment 406. Each of the wires 402, 404 is coated with an insulating material, which may be a plastic material or paper. The function of the insulating material is to provide insulation between each wire and adjacent wires. Damage to the insulating material or oxidation of the metal of a wire can cause the resistance between two adjacent wires to fall.

The effectiveness of the insulation between wires 402, 404 can be determined by measuring the resistance R1 between the A wire 402 and the B wire 404 and the resistance R2 between the B wire 404 and the A wire 402. The resistances R1 and R2 may be different because of rectification as indicated by diodes D1 and D2. For a circuit in good condition, the resistances R1 and R2 are high, greater than 1 megohm. Damage to the insulating material or oxidation will cause the resistances R1, R2 to fall by an amount which depends upon the severity of the damage or oxidation. If the insulating material is totally destroyed so that the A and B wires are physically touching each other, the values of resistances R1, R2 will depend upon the distance between the test head 80 and the point of damage but will typically lie in the range 0 to 1500 ohms. Oxidation can result in wires effectively touching each other.

Only the A and B wires 402, 404 of the line 400 being tested are disconnected. In the other lines, the bias voltage of 50 volts is applied between the A wire and the B wire. In FIG. 8, the A wires of the other lines are collectively shown by a wire 410 which is connected at the switch 10 to earth.

The B wires of the other lines are collectively shown by a wire 412 connected at the switch to a potential of −50 volts.

If the insulating material separating the A wire 402 or the B wire 404 from one of the adjacent A or B wires becomes damaged, or if one of the wires suffers oxidation, current may flow. The effectiveness of the insulation between the A and B wires 402, 404 and adjacent A and B wires can be determined by measuring the resistance R3 between A wire 402 and adjacent A wires 410, the resistance R4 between the A wire 402 and adjacent B wires 412, the resistance R5 between the B wire 404 and adjacent A wires 410, and the resistance R6 between the B wires 404 and adjacent B wires 412.

For a good circuit, the resistance R3, R4, R5, R6 are high, greater than 1 megohm. Damage to insulating material may cause one or more of the resistances R3, R4, R5, R6 to fall by an amount which depends upon the severity of the damage. If the insulating material between the A wire 402 or the B wire 404 and an adjacent wire is totally destroyed so that the two wires are physically touching each other, the resistance between the two touching wires will depend upon the distance between the test head 80 and the point of damage but will typically lie in the range 0 to 1500 ohms. Oxidation can also result in two wires effectively touching each other.

The A and B wires 402, 404 and the insulating material between them act as a capacitor. In FIG. 8, the capacitance between the A and B wires is shown as having a value C1. The value of the capacitance between the A and B wires of a line will depend upon the length of the line. A break in the line 400 will reduce the value of capacitance C1 as measured from the test head 80. FIG. 8 also shows the capacitance C2 between the A wire 402 and earth and the capacitance C3 between the B wire 404 and earth.

Each night, the controller 106 causes the test head 80 to measure the resistances R1, R2, R3, R4, R5, R6 and the capacitances C1, C2, C3 for each terminating line of the access network 12. The controller 106 also causes the test head 80 to check if there is terminal equipment connected to the end of the line. Terminal equipment has a standard capacitance value. When terminal equipment is connected, the value of its capacitance is subtracted from from the capacitance as measured by the test head to obtain the capacitance C1. For each terminating line, the results of the tests are stored against its directory number in the access network management system 102.

The controller 106 transmits the results of the tests to the access network management system 102. The access network mangement system 102 examines the results of the series of tests for each terminating line for the presence of a suspected fault. The possible faults include disconnection, short circuit, a fault battery voltage, an earth fault and low insulation resistance.

When a fault is suspected, the name of the fault and the results of the test for the line are stored in the access network mangement system 102 against its directory number or an identifier in the exchange associated with the line. The details of the suspected faults found each night may be reviewed by an operator of the access network management system 102. Where appropriate, the operator may give instructions for a fault to be repaired.

As mentioned above, data relating to the terminating lines and nodes is stored in the access network management system 102. For each node, this data includes the history of engineering interventions in the node, the presence or absence of an active engineering intervention in the node and the presence or absence of an active adverse visual report on the condition of the node. Data on loss of pressure in the main cable 14 is also stored in the access network management system 102.

A mapping of the access network 12 is stored in both the customer service system 100 and the access network management system 102. For each line, and hence for each circuit, the mapping records the route and hence each node through which the line passes. For each node, it records the lines passing through the node.

Referring now to FIG. 6A, there is shown a flow chart of the series of operations which may be performed when a customer reports a fault on one of the terminating lines of the access network 12 to an operator of the customer service system 100. As will become apparent, in an appropriate case a list is produced of the nodes through which the terminating line passes ranked in order of the likelihood of the fault being present at each node.

Initially a customer reports a fault on one of the terminating lines to an operator in the customer service system in a step 200. If the operator considers that the fault is in the access network 12, the operator sends an instruction to the controller 106 of line tester 80 to perform a series of tests on the terminating line. The line tester 80 then performs the same series of tests as it performs in the nightly tests on the terminating lines. The results of the series of tests are then transmitted by the line tester 80 to the access network management system 102. The access network management system 102 examines the results for the presence of a suspected fault and, where appropriate, estimates the distance of the fault from the local switch 10. The details of the suspected fault are transmitted to the customer service system 100.

Where the operator in the customer service system considers that it is appropriate for the fault to be investigated by an operator in the access network management system 102, in a step 201, the operator in the customer service system asks an operator in the access network management system 102 to investigate the fault.

The operator in the access management system then decides what to do about the fault report. This decision will depend on the details of the suspected fault and his knowledge of the state of the terminating lines in the access network 12. For example, if the fault report indicates that there is a disconnection and the operator knows that one of the nodes through which the terminating line passes has been severely damaged but is under repair, it may be appropriate for the operator merely to advise the customer that the damage is being repaired. Usually, the operator will decide to obtain a list of the nodes through which the terminating line passes ranked in the order of the likelihood of the fault being present at each node. If the operator decides to obtain this list, in a step 203, the operator invokes a ranking algorithm. The remainder of the flow chart shown in FIG. 6 refers to the steps which are performed in this algorithm.

The ranking algorithm is entered in a step 204. The ranking algorithm is held as part of a program of the access network management system 102. As will become apparent from the following description, for each of the nodes on the terminating line on which a fault is suspected, an individual score is evaluated for each one of a set of factors relating to the likelihood of the suspected fault being present at the node and the individual scores are then combined to produce a combined score for the node. The nodes are then ranked in accordance with their combined scores. In evaluating each individual score, the data contained in the fault report and also the data contained in the access network management system relating to the nodes and the terminating lines are used.

After entering the ranking algorithm, in a step 205, the route followed by the terminating line on which a fault is suspected is identified and all the nodes on this route are then found. Next, as shown in FIG. 6B, in a step 206, the first node on this route is selected.

In a step 207, the individual score for the first factor is evaluated. The first factor is historical intervention analysis. The score for this factor is evaluated in five stages as follows:

stage 1: for at least one engineering intervention in previous five days, score 3000;

stage 2: for at least one engineering intervention in the previous 30-day period but excluding the previous five-day period, score 2000;

stage 3: for at least one engineering intervention in the previous 90-day period but excluding the previous 30-day period, score 1000;

stage 4: for the total number of engineering interventions in the previous 90-day period, score 100 times number of interventions.

The total score for the historical intervention analysis factor evaluated in step 207 is then the sum of the scores found in stages 1 to 4 above.

The next factor is visual inspection analysis and this is evaluated in step 208. If there is an adverse active visual report for the node, the score for this factor is evaluated in step 208 as 2000.

The next factor is active intervention analysis and this factor is evaluated in step 209. This factor is evaluated in two stages. In the first stage, if there is active engineering work at the node, a score of 3000 is made. In the second stage, if there is active engineering work on any terminating line passing through the node, a score of 3000 is made. The total score for this factor is then the higher of the scores found in stages 1 and 2.

The next factor is suspect line analysis and this factor is evaluated in step 210. For each terminating line which passes through the node and on which a fault is suspected and which is of the same type as the suspected fault under study, a score of 1000 is made. Thus, if the suspected fault is a disconnection and disconnection is also suspected on three other terminating lines which pass though the node, then the total score is 3000.

Next, in a step 211, a check is made for the presence of scoring factors among the visual inspection analysis factor as evaluated in step 208, the active intervention analysis factor as evaluated in step 209 and the suspect line analysis factor as evaluated in step 210. If two or three of these factors score, then the combined score for the factors evaluated in steps 208 to 210 is the sum of the individual factors multiplied by two. If only one of these factors scores, then the total score for the factors evaluated in steps 208 to 210 is the score for this individual scoring factor.

Next, as shown in FIG. 6C, in a step 212, the score is evaluated for the proximity analysis factor. The score for this factor is evaluated in two stages. As will be recalled from the above description, the access network management system contains data on the distance between the local switch 10 and the nodes derived from two sources. The first source is the measurements which are made as a result of engineers opening the nodes and performing the series of operations shown in the flow chart of FIG. 5. The second source of information is the distances which are found from maps of the terminating lines. The proximity analysis is performed using both sources of data.

For the first source of data, that is distances derived from opening the nodes, the score is evaluated as follows:

if the proximity of the node to the estimated location of the suspected fault is less then 50 m, score 3000;

if the proximity of the node to the estimated location of the suspected fault is equal to or greater than 50 m but less then 100 m, score 2000, if the proximity of the node to the estimated location of the fault is equal to or greater than 100 m and less then 150 m, score 1000.

For the second source of data, that is data derived from maps of the terminating lines, the score is evaluated in the same manner as that specified for the first source of data. The total score for the proximity analysis factor is then obtained by adding the scores obtained by using the data from the two sources.

In step 212, when evaluating the score for each source of data, if the distance is not available for the distance of the node from the switch for that source of data, then the score is 0.

Next, in a step 213, a score is evaluated for the pressure analysis factor. The pressure is the pressure in the cable 14 leading from the switch 10 to the primary cross-connect point 16. If the pressure is below a threshold value, the score is evaluated as 3000.

Next, in a step 214, the operator is invited to add a manual score and, normally, an operator will do this if he knows of some special problem.

Next, in a step 215, each scoring factor is compared with the fault type and an additional score is made in accordance with Table 1 set out below. In this table, the visual inspection analysis factor of step 208, the active intervention analysis factor of step 209 and the suspect line analysis factor of 210 are treated as a single factor. The proximity analysis factor evaluated in step 212 is divided into two sub-factors. The first sub-factor is the proximity analysis performed using the first source of data, that is data obtained by opening the node and calculating the distance from line tests. The second sub-factor is the proximity analysis factor evaluated from the second source of data, that is maps of the terminating lines.

Referring to Table 1, for example, if the fault is a short circuit, additional scores are made as follows. If there is a score for the historical intervention factor of step 207, an additional score of 3000 is made. If there is a score for one or more of the factors of steps 208 to 210, an additional score of 1000 is made. If there is a score for the pressure analysis factor of step 213, an additional score of 4000 is made. If there is a score for the proximity analysis factor derived from the first source of data, a score of 4000 is made. If there is a score for the proximity analysis factor obtained from the second source of data, a score of 4000 is made. The total additional weighting score is the sum of the individual scores.

TABLE 1

Additional Weighting for Fault Type

|  | Dis-connection | Short Circuit | Battery | Earth | Low Insulation Resistance |
| --- | --- | --- | --- | --- | --- |
| Historical intervention | 3000 | 3000 | 3000 | 3000 | 3000 |
| Visual inspection Active intervention Suspect line | 1000 | 1000 | 4000 | 4000 | 4000 |
| Pressure | 4000 | 4000 | 2000 | 2000 | 2000 |
| Proximity (first data source) | 4000 | 4000 | 2000 | 2000 | 2000 |
| Proximity (second data source) | 4000 | 4000 | 2000 | 2000 | 2000 |

Next, in a step 216, a check is made for coincidence in scoring factors. More specifically, if there is only a single scoring factor, a jump is made to step 218. If there are two or more scoring factors, the algorithm goes to step 217 before proceeding with step 218 as shown in FIG. 6D. For the purposes of step 216, the factors of steps 208 to 210 are combined and the factor of step 212 is divided into sub-factors in the manner discussed in relation to Table 1 above.

In step 217, if there are two or more scoring factors, the highest score is taken and increased by 10000. For this purpose, for steps 208 to 211, the score obtained for these steps at the end of 211 is used. The score obtained in this way then becomes the combined score for the individual factors for the node. If there is only a single scoring factor, this factor becomes the combined score for the nodes.

In step 218, a check is made to determine if there are any more nodes for which a combined score is to be evaluated. If there are one or more nodes still remaining, the algorithm returns to step 206 and the next node is selected. If there are no more nodes, the algorithm continues with step 219.

In step 219, the nodes are ranked in order of their scores in descending order. Thus, the node at the top of the list is the most likely location of the fault. In step 210, the node with the highest score is then selected and in step 211 the operator is given the opportunity to override the result and an operator would normally do this in view of special circumstances known to him.

Figure 7:
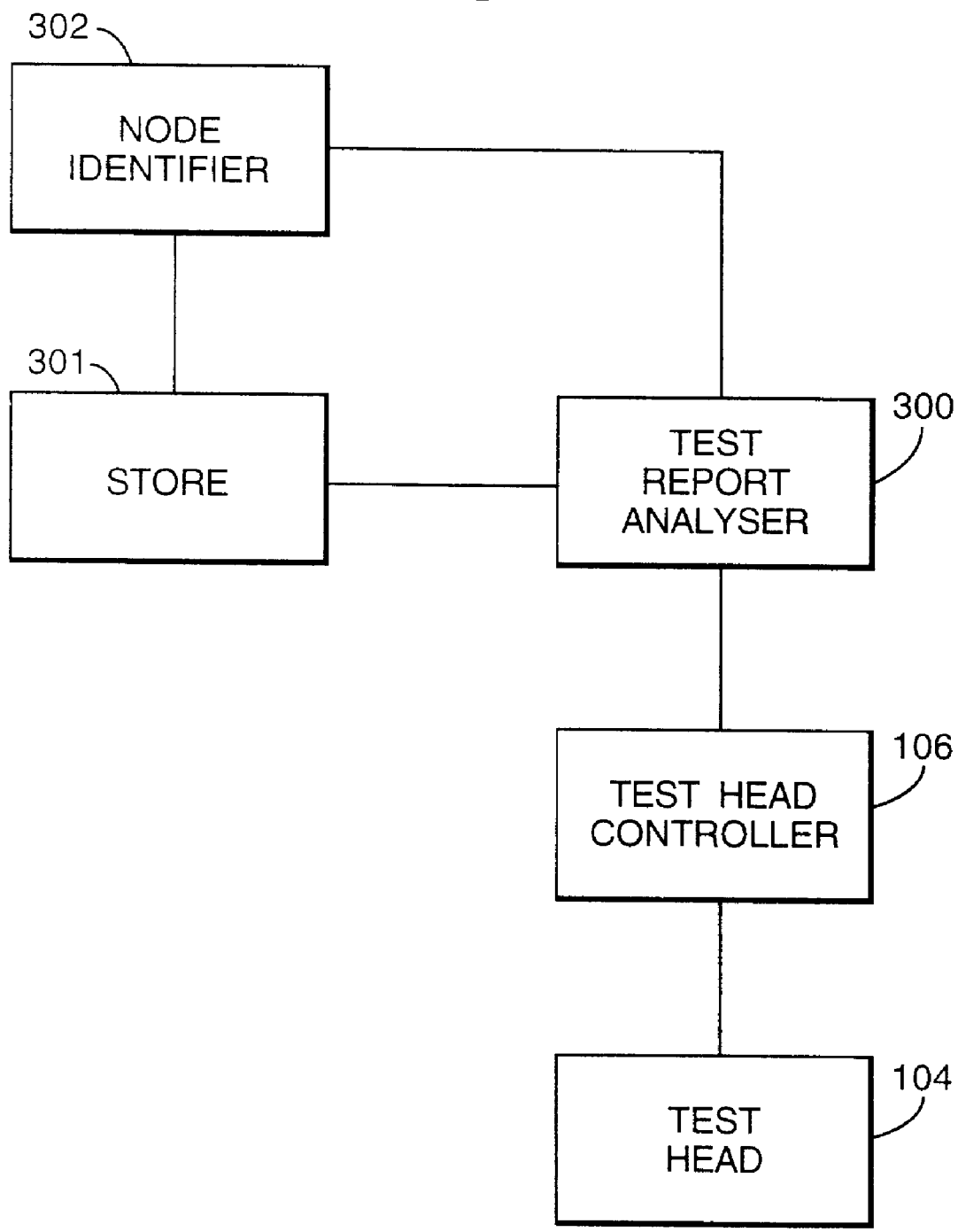
FIG. 7 is a functional block diagram of the fault management system.

Referring now to FIG. 7, there is shown a functional block diagram of the fault management system described with reference to FIGS. 3 to 6A–D. As shown in FIG. 7, the fault management system comprises the test head 104, the test head controller 106, a test report analyser 300, a store 301 and a node identifier 302. The test head 104 and the test head controller 106 have already been described. The test report analyser 300, the store 301 and the node identifier 302 are implemented by the access network management system 102. More specifically, the test report analyser is the part of the program of the access network management system which is responsible for performing steps 206 to 221 of the ranking algorithm. The store 301 is that part of the store of the computer used to implement the access network management system 102 and which contains data relating to the nodes and the terminating lines. The node identifier 302 is that part of the program which is responsible for step 205 of the ranking algorithm.

There will now be described with reference to FIG. 9 the individual steps of a routine which is performed each night by the access network network management system 102 to monitor the operational condition of the individual nodes of the access network 12. As will become apparent from the following description, the routine uses the resistance values RI to R6 for each circuit obtained by the routine nightly test on the individual circuits. The routine shown in FIG. 9 also uses the mapping of the access network 12 which is stored in the access network management system 102.

Figure 9:
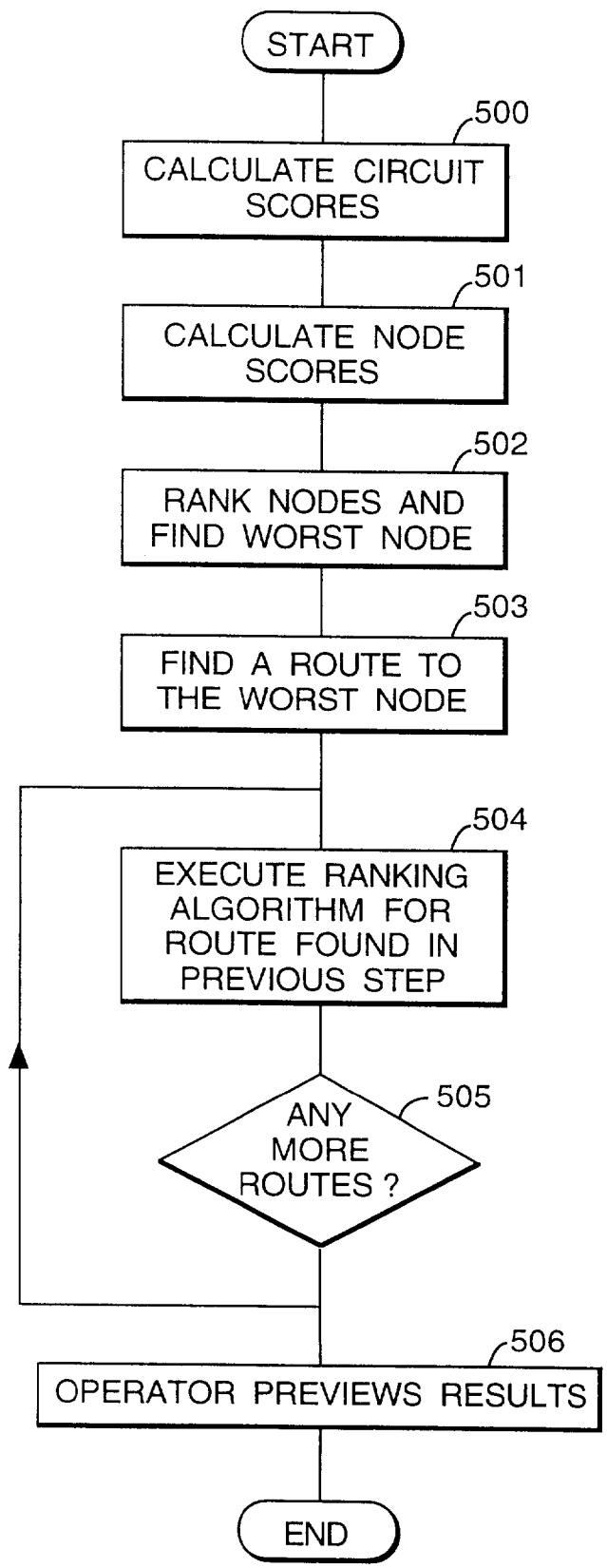
FIG. 9 is a flow chart of the steps which are performed in the fault management system to monitor the operational condition of the nodes of the access network.

Referring now to FIG. 9, after entering the routine, in a step 500 a circuit score S is calculated for each circuit from the resistance measurements R1 to R6. The circuit score S is indicative of both the probability of a circuit having or developing a fault and the operational quality of the circuit. A relatively high circuit score indicates that there is a high probability of the circuit having or developing a fault and that the operational quality of the circuit is poor. A relatively low circuit score indicates that there is a low probability of the circuit having or developing a fault and that the operational quality of the circuit is good.

In order to calculate the circuit score S for a circuit, each resistance value Ri is converted into a converted value Vi using a formula which will be described below. The converted value Vi is indicative of the probability of the resistance causing a fault. Each converted value Vi is multiplied by a weighting factor Wi to obtain the product Vi*Wi. The products Vi*Wi for all six resistance measurements are then summed to produce the circuit score S.

Thus, the circuit score of S is defined by the following equation:

$$S=\Sigma Vi*Wi$$

Each converted value Vi is calculated for the corresponding resistance value by using the following formula:
If $$Ri \leq P, Vi=0$$

If $$P<Ri \leq Q, Vi=b\ 1$$

If $$Ri>M, Vi=0$$

If $$Q<Ri \leq M, \text{then}$$

$$Vi=\{[1/(1+((Ri-Q)/L)^{0.3})]+[-1*(Ri-1*10^6)/(1*10^6-Q)]\}/2$$

where

P is a lower threshold set to 1 kΩ

Q is an upper threshold set to 5 kΩ

M=1 MΩ

L is constant set to 1 kΩ

Figure 10:
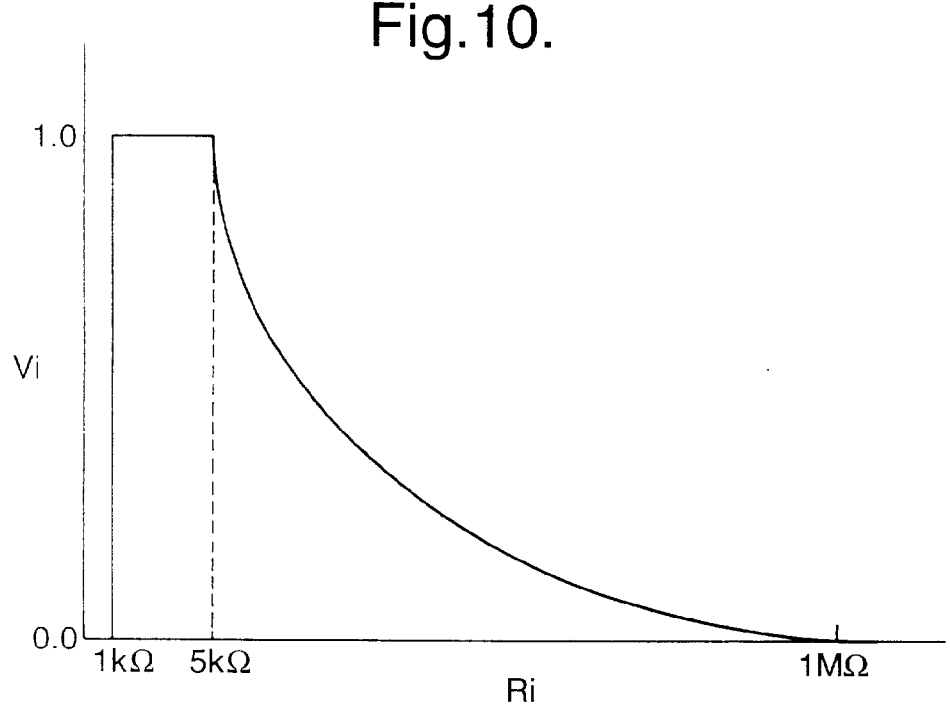
FIG. 10 is a graph illustrating how a resistance value is converted into a converted value when performing one of the steps shown in the flow chart of FIG. 9.

A graph of Vi plotted against Ri using the formula set out above is shown in FIG. 10.

The formula for calculating Vi has been developed empirically. However, the physical explanation behind the formula is as follows:

When a resistance Ri of a circuit has a value less than 1 kΩ, it is very likely that the cause of the low resistance is a fault in the terminal equipment, and so the value of Vi is set to zero. Where a resistance Ri has a value in the range 1 kΩ to 5 kΩ it is almost certain that there is an associated fault. For a resistance value greater than 5 kΩ, the probability of the existence of an associated fault falls both progressively and progressively less steeply with increasing value of Ri. Where a resistance Ri has a value greater than 1 MQ, it is very unlikely that there is an associated fault.

For each type of resistance R1 to R6, in the case of a distribution point, the value of the corresponding weighting factor is determined from the following table:

| Types of Resistance | Weighting Factor Ri |
|---|---|
| R1 (A wire to B wire) | 15 |
| R2 (B wire to A wire) | 15 |
| R3 (A wire to earth) | 5 |
| R4 (A wire to −50 V) | 30 |
| R5 (B wire to earth) | 30 |
| R6 (B wire to −50 V) | 5 |

For each type of resistance R1 to R6, in the case of a node other than a distribution point, the value of the corresponding weighting factor is determined from the following table:

| Types of Resistance | Weighting Factor Ri |
|---|---|
| R1 (A wire to B wire) | 5 |
| R2 (B wire to A wire) | 5 |
| R3 (A wire to earth) | 5 |
| R4 (A wire to −50 V) | 50 |
| R5 (B wire to earth) | 5 |
| R6 (B wire to −50 V) | 30 |

After determining the circuit score S for each circuit is step 500, the routine progresses to step 501. In this step, it calculates a node score H for each node.

In order to calculate the node score H for a node, all the circuits passing through the node are identified. The individual circuit scores S for the individual circuits passing through the node are then summed and the result is divided by √n. n is the number of resistance measurements for circuits passing through the node having a value less than 1 MΩ. Thus, the node score H for a node is defined by the following equation:

$$H=\Sigma S*\sqrt{n}/n=\Sigma S/\sqrt{n}$$

The node score H for a node is indicative of both the probability of the operational state of the node causing a fault in one or more of the circuits passing through the node and the operational quality of the node. A relatively high node score indicates that there is high probability of the operational state of the node causing a circuit fault and that the operational quality of the node is poor. A relatively low node score indicates that there is a low probability of the operational state of the node causing a fault and that the operational quality of the node is good.

In the equation set out above for calculating a node score H, ΣS is divided by n so as to provide an averaging effect for resistance measurements on circuits passing through the node having a value less than 1 MΩ. This makes node scores for nodes carrying a large number of circuits comparable with node score for nodes carrying a small number of circuits. As will be explained below, the nodes are ranked in accordance with their node scores. However, the node scores of nodes carrying only a few circuits are very sensitive to the number of resistance measurements less than 1 MΩ. More generally, as the number of circuits passing through a node increases, and hence potentially the number of resistance measurements less than 1 MΩ increases, the reliability of the node score as an indicator of the operational quality of the node increases. In the equation set out above for calculating a node score H, ΣS/n is multiplied by √n so as to give progressive emphasis to the node score as the number of resistance measurements less than 1 MΩ increases.

Next, in a step 502, the nodes are ranked in accordance with their node scores H. The node having the highest node score H is identified as the worst node and selected for further investigation.

Although the relatively high node score of the worst node may be caused by the operational state of the worst node, it may also be caused by the operational state of one of the nodes on the route from a local switch to the worst node. The node score H is obtained from resistance measurements and does not take other factors into account. In order to identify the exact location of the node having a poor operational quality, the ranking algorithm described with reference to FIG. 6 is used.

Accordingly, in step 503, a route from the local switch 10 to the worst node is found and all the nodes on the route up to, and including, the worst node are found. Steps 206 to 219 of the ranking algorithms are then executed for this route in a step 504.

Occasionally, there is more than one route from a local switch to a node. In a step 505, a check is made for the existence of another route to the worst node. If there are one or more further routes, steps 505 and 504 are executed for all such further routes.

Lastly, in a step 506, the operator decides whether to ask an engineer to investigate on or more of the nodes for possible faults. When the routine reaches step 506, the operator will know the identity of the worst node. Also, for the nodes on each route to the worst node, he will have a list of the nodes as ranked by the ranking algorithm. In deciding whether to ask an engineer to investigate one or more of the nodes, the operator combines this data with his own knowledge of the access network 12.

In addition to investigating the worst node, the operator may also investigate other nodes, for example the next worst node or other nodes having high node scores. In order to do this steps 504 to 506 are performed for each such node.

The routine of FIG. 9 make it possible to identify and investigate at an early stage nodes where there is a risk that the operational state of the node is deteriorating to a point where faults may occur. It will usually be possible to restore the operational state of such node before a fault occurs which leads to a fault report.

Figure 11:
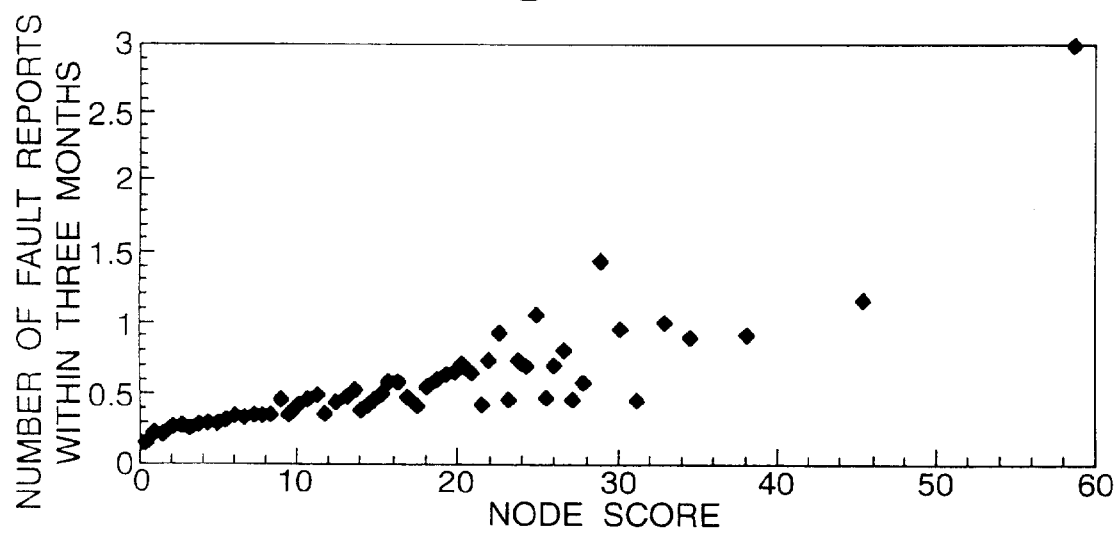
FIG. 11 is a graph showing some experimental results obtained by monitoring nodes by using the steps shown in the flow chart of FIG. 9.

FIG. 11 shows the results of some experimental work in the nodes in an access network forming part of BT's UK public telecommunications network. The node score was evaluated for a large number of nodes. Each node was then monitored for a fault report from a customer during the subsequent 3 months. In FIG. 11, for these nodes, the node score is plotted against fault reports received during the three months after evaluating the node score. These experimental results show a strong correlation believed node score and number of fault reports.

Although the present invention has been described with reference to an access network in which each circuit is carried by a piece of copper wire, it may also be used for terminating circuits carried by optical fibres.

What is claimed is:

1. A method of operating a fault management system for a telecommunications network, said telecommunications network including a switch and an access network of terminating circuits connecting said switch to terminal equipment provided for users of the telecommunications network, each of said terminating circuits passing through a series of nodes between said switch and its respective terminal equipment, said fault management system comprising:

circuit testing apparatus arranged to perform circuit tests on said terminating circuits; and a computer system for controlling the circuit testing apparatus, said computer system including a store containing data relating to said terminating circuits and said nodes;

said method comprising the following steps performed by said computer system:

instructing said circuit testing apparatus to perform a circuit test on each circuit of at least a subset of said terminating circuits and to produce a test result for each circuit tested;

converting the test results into circuit scores each of which is indicative of the operational quality of the tested circuit; and for each node of at least a subset of said nodes, combining the circuit scores of the tested circuits passing through the node to produce a node score which is indicative of the operational quality of the node.

2. A method on claims in claim 1, comprising the additional steps of:

ranking the nodes in accordance with their node scores.

3. A method as claimed in claim 1, in which:

each of said circuits is formed from a pair of wires;

each circuit test is performed by making a set of resistance measurements on the respective pair of wires to produce a corresponding set of resistance values; and in said step of converting the test results into circuit scores, each test result is converted into a circuit score by:

converting each resistance value into a converted value which is indicative of the probability of the measured resistance causing a fault; and summing the individual converted values.

4. A method as claimed in claim 3, in which:

in said step of combining the circuit scores of the tested circuits passing through a node, the node score is obtained by:

summing the individual scores of the tested circuit passing through the node; and dividing the result by a factor which is a function of the total number of resistance measurements made on circuits passing through the node giving a resistance value falling in a predefined range.

5. A method as claimed in claim 4, in which said factor is the square root of said total number of resistance measurements giving a resistance value falling in said predefined range.

6. A fault management system for a telecommunications network including a switch and an access network of terminating circuits connecting said switch to terminal equipment provided for users of the telecommunications network, each of said terminating circuits passing through a series of nodes between said switch and its respective terminal equipment, said fault management system comprising:

circuit testing apparatus arranged to perform circuit tests on said terminating circuits to produce test results;

a store containing data relating to said terminating circuits and said nodes;

means for converting a test result into a circuit score which is indicative of the operational quality of the tested circuit; and means for combining the circuit scores of the tested circuits passing through a node to produce a node score which is indicative of the operational quality of the node.

7. A fault management system as claimed in claim 6, further comprising:

means for ranking the nodes in accordance with their circuit scores.

8. A fault management system as claimed in claim 6, in which:

said test apparatus is arranged to perform a circuit test by making a set of resistance measurements on the respective pair of wires to produce a corresponding set of resistance values; and said means for converting a test result into a circuit score comprises:

means for converting each resistance value into a converted value which is indicative of the probability of the measured resistance causing a fault; and means for summing the individual converted values.

9. A fault management system as claimed in claim 8, in which said means for combining circuit scores to produce a node score comprises:

means for summing the individual circuit scores of the tested circuits passing through a node; and means for dividing the result by a factor which is a function of the total number of resistance measurements made on circuits passing through the node giving a resistance value falling in a predefined range.

10. A fault management system for a telecommunications network including a switch and a network of terminating circuits connecting said switch to terminal equipment provides for users of the telecommunications network, each of said terminating circuits passing through a series of nodes between the said switch and its respective terminal equipment, said fault management system comprising:

circuit testing apparatus arranged to perform circuit tests on said terminating circuits to produce test results;

a computer system for operating said circuit testing apparatus;

said computer system including a store containing data relating to said terminating circuits and said nodes;

said computer system being controlled by at least one program so as to perform the following operations:

instruct said circuit testing apparatus to perform a circuit test on each circuit of at least a subset of said terminating circuits and to produce a test result for each circuit so tested;

convert the test results into circuit scores each of which is indicative of the operational quality of the test circuit; and for each node of at least a subset of said nodes, combine the circuit scores of the tested circuits passing through the node to produce a node score which is indicative of the operational quality of the node.

* * * * *